Patented Dec. 10, 1940

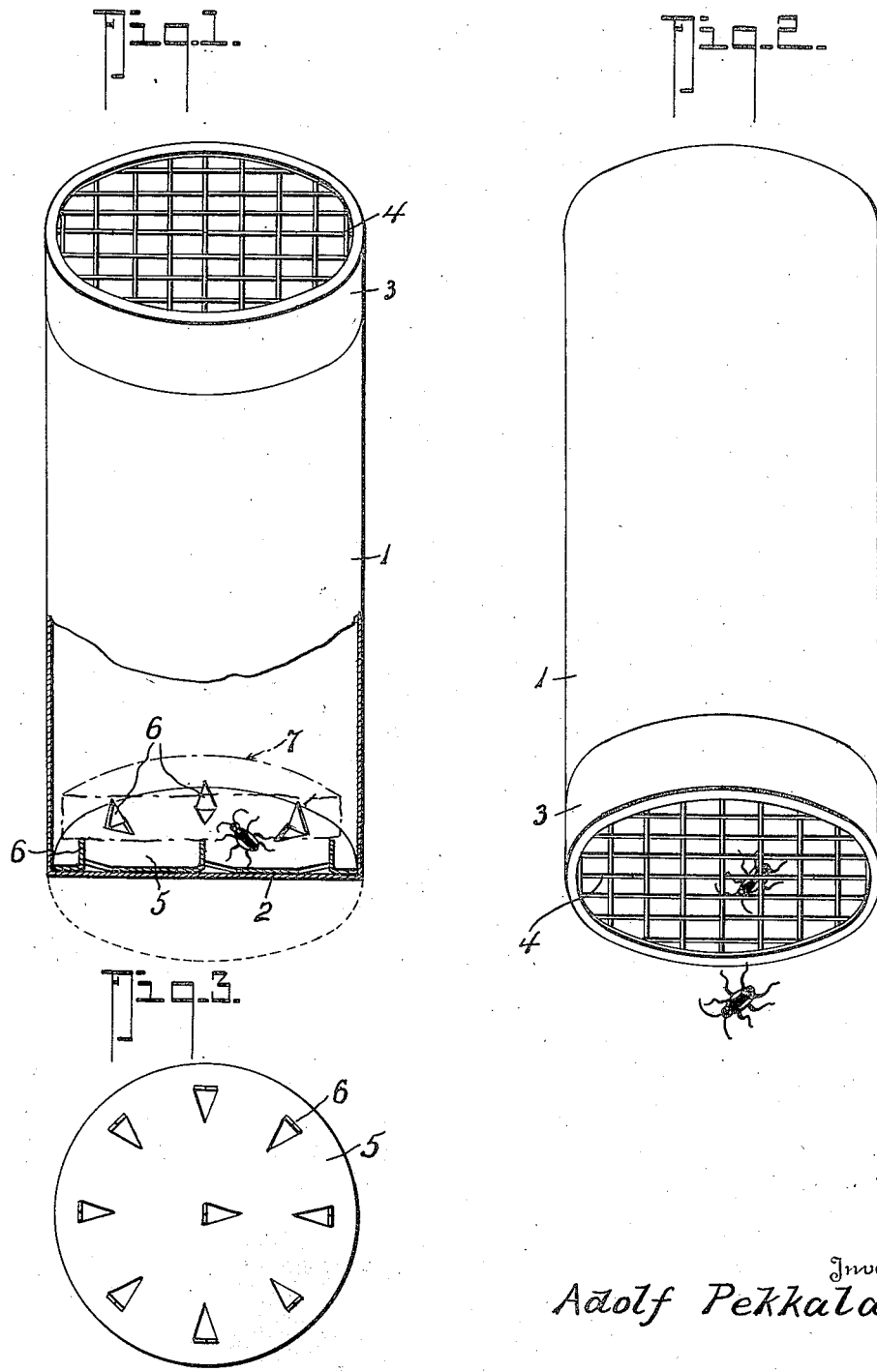

2,224,485

UNITED STATES PATENT OFFICE 2,224,485

ROACH TRAP

Adolf Pekkala, New York, N. Y.

Application November 29, 1939, Serial No. 306,733

3 Claims. (Cl. 43—121)

My invention relates to certain new and useful improvements in insect traps, and especially roach traps.

The invention particularly has for an object to provide a roach trap of a simple, inexpensive construction in which the roaches find a good hiding place beneath the bait and thus will remain in the trap even when daylight or artificial light occurs.

Another object is to provide a trap from which the roaches can be shaken without removing the cover of the receptacle and without losing the bait.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which:

Fig. 1 is a perspective view and part sectional perspective view showing my invention, the bait being indicated by dot and dash lines.

Fig. 2 is a perspective view of the trap inverted for the purpose of shaking out the roaches.

Fig. 3 is a plan view of one form of spiked disc that may be used to hold up the bait so the roaches can hide beneath it.

In the drawing, in which like numbers of reference indicate like parts in all the figures, 1 is a receptacle, preferably a round tin can of any desired size, having a bottom 2 and a removable top 3. In adapting the can to my invention the top or cover 3 is cut out and the space filled by a wide mesh screen 4 through which the roaches can pass freely.

In the can or receptacle 1 is dropped a disc 5 having tangs punched in it. The disc is located on the bottom 2 of the receptacle with the tangs or points 6 directed upwardly, and a piece of bread, cake 7, or other suitable "bait," is placed in the can and rests on the tangs 6 (see Fig. 1). The tangs hold the bait off the bottom of the can so as to leave a space in which the roaches can hide. The piece of bait is of sufficiently less diameter than that of the can so as to leave a space for the roaches to pass.

The can, with some dry food in it, is left in some convenient place in the home over night. The roaches will climb up the outside of the can and go in through the screen 4 at the top. In the morning the can is inverted over the waste drain and the roaches shaken out (Fig. 2). They will fall through the screen 4 but the food 7 will not. When new food is to be added, the cover 3 is removed and the food put in.

The length of the tangs 6 and their number is optional, and will depend on the amount of space it is desired to leave below the bait and also on the size of the can.

From the foregoing description, taken with the accompanying drawing, it is thought that the construction, operation and advantages of the invention will be clear.

What I claim is:

1. A roach trap comprising a can having a wide mesh screened opening, a set of tangs inside the can at the bottom to support a piece of suitable bait above the bottom and leave a hiding space for the roaches in the can.

2. A roach trap comprising a can having a cover provided with an opening screened with a mesh of sufficiently large size to permit passage of roaches, and means in the can at the bottom for supporting a piece of bait above the bottom to provide a hiding space for the roaches within the can.

3. A roach trap comprising a can having a cover provided with an opening screened with a mesh of sufficiently large size to permit passage of roaches, and means in the can at the bottom for supporting a piece of bait above the bottom to provide a hiding space for the roaches within the can, said means consisting of a plate carrying a plurality of upwardly projecting elements on which the bait rests and by which it is held clear of the bottom of the can.

ADOLF PEKKALA.